United States Patent
Rodriguez Erdmenger et al.

(10) Patent No.: US 11,118,469 B2
(45) Date of Patent: Sep. 14, 2021

(54) SEAL ASSEMBLY FOR A TURBO MACHINE

(71) Applicant: General Electric Company, Schenectady, NY (US)

(72) Inventors: Rodrigo Rodriguez Erdmenger, Munich (DE); Nathan Evan McCurdy Gibson, West Chester, OH (US); Quang Tue Nguyen Tran, Munich (DE); Antonio Guijarro Valencia, Munich (DE)

(73) Assignee: General Electric Company, Schenectady, NY (US)

( * ) Notice: Subject to any disclaimer, the term of this patent is extended or adjusted under 35 U.S.C. 154(b) by 148 days.

(21) Appl. No.: 16/194,653

(22) Filed: Nov. 19, 2018

(65) Prior Publication Data

US 2020/0157964 A1    May 21, 2020

(51) Int. Cl.
*F01D 11/16* (2006.01)

(52) U.S. Cl.
CPC .......... *F01D 11/16* (2013.01); *F05D 2220/32* (2013.01); *F05D 2240/11* (2013.01); *F05D 2240/55* (2013.01)

(58) Field of Classification Search
CPC ........ F01D 11/02; F01D 11/025; F01D 11/16; F01D 11/18; F01D 11/04; F01D 11/001; F05D 2220/32; F05D 2250/42; F05D 2250/43; F05D 2250/24; F05D 2250/241; F05D 2250/314; F05D 2260/38; F16J 15/445
See application file for complete search history.

(56) References Cited

U.S. PATENT DOCUMENTS

| | | | | |
|---|---|---|---|---|
| 2,646,999 A | * | 7/1953 | Barske Ulrich | F16J 15/42 277/425 |
| 3,383,033 A | | 5/1968 | Moore | |
| 3,501,245 A | * | 3/1970 | Ivanko | F01D 11/025 184/6.11 |

(Continued)

FOREIGN PATENT DOCUMENTS

| | | | | |
|---|---|---|---|---|
| EP | 382333 A | * | 8/1990 | |
| GB | 724316 A | * | 2/1955 | F01D 11/025 |

(Continued)

OTHER PUBLICATIONS

International Search Report Corresponding to Application No. PCT/US2019/062214 dated May 29, 2020.

*Primary Examiner* — David E Sosnowski
*Assistant Examiner* — Wayne A Lambert
(74) *Attorney, Agent, or Firm* — Dority & Manning, P.A.

(57) ABSTRACT

An aspect of the present disclosure is directed to a seal assembly. The seal assembly includes a fluid bearing wall including a bearing face defining a fluid opening through the fluid bearing wall. The seal assembly further includes a tilt member is extended from and attached to the fluid bearing wall. The tilt member defines a fluid passage therethrough in fluid communication with the fluid opening at the bearing face of the fluid bearing wall. The seal assembly still further includes a seal body surrounding the tilt member. A cavity is defined between the tilt member and the seal body. The seal assembly further includes a spring member coupled to the seal body and the fluid bearing wall. A passage is defined between the fluid bearing wall and the seal body.

19 Claims, 4 Drawing Sheets

(56) References Cited

U.S. PATENT DOCUMENTS

| | | | | |
|---|---|---|---|---|
| 3,743,303 A * | 7/1973 | Pope | | F01D 11/00 |
| | | | | 277/422 |
| 4,053,162 A * | 10/1977 | Bjerk | | F16C 9/02 |
| | | | | 277/431 |
| 4,082,296 A * | 4/1978 | Stein | | F16J 15/3412 |
| | | | | 277/400 |
| 4,302,963 A * | 12/1981 | Collins | | G01M 13/04 |
| | | | | 415/118 |
| 5,102,295 A * | 4/1992 | Pope | | F01D 25/168 |
| | | | | 415/104 |
| 5,370,402 A * | 12/1994 | Gardner | | F16J 15/3292 |
| | | | | 277/411 |
| 5,603,510 A * | 2/1997 | Sanders | | F01D 11/025 |
| | | | | 277/413 |
| 5,975,537 A * | 11/1999 | Turnquist | | F16J 15/443 |
| | | | | 277/411 |
| 6,161,836 A * | 12/2000 | Zhou | | F16J 15/3288 |
| | | | | 277/355 |
| 6,431,550 B1 * | 8/2002 | Tong | | F16J 15/442 |
| | | | | 277/346 |
| 6,505,837 B1 * | 1/2003 | Heshmat | | F01D 11/02 |
| | | | | 277/411 |
| 6,676,369 B2 | 1/2004 | Brauer et al. | | |
| 6,758,477 B2 | 7/2004 | Brauer et al. | | |
| 7,066,470 B2 | 6/2006 | Turnquist et al. | | |
| 7,249,769 B2 * | 7/2007 | Webster | | F01D 11/025 |
| | | | | 277/410 |
| 7,797,941 B2 | 9/2010 | Munsell et al. | | |
| 7,832,734 B2 * | 11/2010 | Beichl | | F16J 15/3288 |
| | | | | 277/355 |
| 7,862,046 B2 * | 1/2011 | Lederer | | F16J 15/342 |
| | | | | 277/348 |
| 8,109,716 B2 * | 2/2012 | Glahn | | F01D 11/04 |
| | | | | 415/168.2 |
| 8,109,717 B2 | 2/2012 | Glahn et al. | | |
| 8,215,645 B1 * | 7/2012 | Aho, Jr. | | F16J 15/342 |
| | | | | 277/370 |
| 8,360,712 B2 * | 1/2013 | Deo | | F04D 29/102 |
| | | | | 415/1 |
| 8,490,980 B2 | 7/2013 | Wright et al. | | |
| 8,753,014 B2 * | 6/2014 | Devitt | | F16C 32/0603 |
| | | | | 384/138 |
| 8,888,441 B2 | 11/2014 | Jordy et al. | | |
| 8,919,779 B2 * | 12/2014 | Jahn | | F16J 15/3476 |
| | | | | 277/348 |
| 8,919,781 B2 | 12/2014 | Justak | | |
| 9,097,350 B2 | 8/2015 | Dale | | |
| 9,255,486 B2 * | 2/2016 | Lu | | F01D 11/001 |
| 9,255,642 B2 | 2/2016 | Bidkar et al. | | |
| 9,291,067 B2 | 3/2016 | Zheng et al. | | |
| 9,394,799 B1 | 7/2016 | Mills et al. | | |
| 9,732,621 B1 | 8/2017 | Sexton et al. | | |
| 9,976,420 B2 | 5/2018 | Tran et al. | | |
| 2005/0110218 A1 * | 5/2005 | Morrison | | F01D 11/001 |
| | | | | 277/358 |
| 2008/0018054 A1 * | 1/2008 | Herron | | F01D 11/02 |
| | | | | 277/409 |
| 2012/0003080 A1 * | 1/2012 | Deo | | F01D 11/001 |
| | | | | 415/174.5 |
| 2012/0248704 A1 * | 10/2012 | Fennell | | F01D 11/10 |
| | | | | 277/360 |
| 2016/0201805 A1 * | 7/2016 | Lewis | | F01D 11/003 |
| | | | | 415/231 |
| 2016/0369641 A1 * | 12/2016 | Davies | | F01D 11/006 |
| 2018/0073639 A1 * | 3/2018 | Webster | | F01D 11/04 |
| 2018/0135759 A1 | 5/2018 | Hoehle et al. | | |

FOREIGN PATENT DOCUMENTS

| | | | | |
|---|---|---|---|---|
| WO | WO-2012057204 A1 * | 5/2012 | | F16J 15/3292 |
| WO | WO2014/081901 A | 5/2014 | | |
| WO | WO2018/022314 A1 | 2/2018 | | |

* cited by examiner

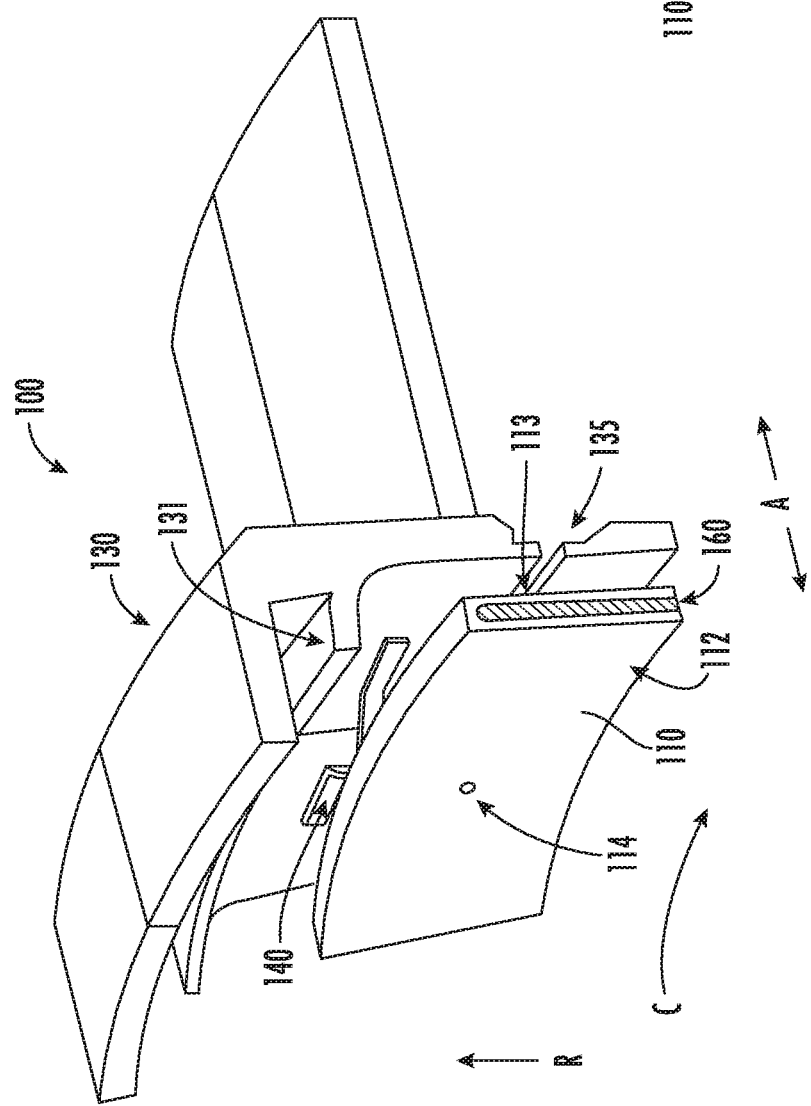
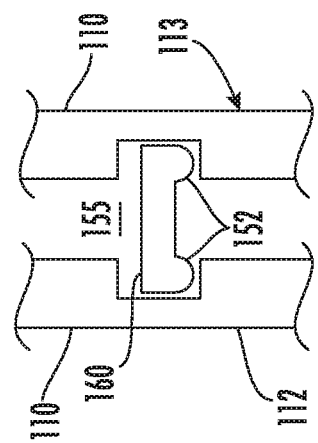

SEAL ASSEMBLY FOR A TURBO MACHINE

FIELD

The present subject matter relates generally to seal assemblies. The present subject matter more specifically relates to generally non-contacting seal assemblies for turbo machines.

BACKGROUND

Non-contact seals, such as aspirating face seals, may be included between static and rotating components of gas turbine engines to provide a fluid bearing surface between a static structure and a rotor assembly. Such seals may operate at relatively tight clearances without contacting the rotor assembly, thus providing relatively little wear.

However, under certain operating conditions of the rotor assembly and the turbo machine, the rotor assembly and/or the seal may tilt relative to one another, thereby providing uneven wear, distortion, or undesired contact and damage to the seal.

As such, there is a need for an improved seal assembly that accommodates tilt or rotation of the seal and rotor assembly relative to one another, such as to improve durability and performance of the seal and the rotor assembly.

BRIEF DESCRIPTION

Aspects and advantages of the invention will be set forth in part in the following description, or may be obvious from the description, or may be learned through practice of the invention.

An aspect of the present disclosure is directed to a seal assembly. The seal assembly includes a fluid bearing wall including a bearing face defining a fluid opening through the fluid bearing wall. The seal assembly further includes a tilt member is extended from and attached to the fluid bearing wall. The tilt member defines a fluid passage therethrough in fluid communication with the fluid opening at the bearing face of the fluid bearing wall. The seal assembly still further includes a seal body surrounding the tilt member. A cavity is defined between the tilt member and the seal body. The seal assembly further includes a spring member coupled to the seal body and the fluid bearing wall. A passage is defined between the fluid bearing wall and the seal body.

In one embodiment, the cavity and the passage are in fluid communication.

In various embodiments, the tilt member further includes a tilt body surrounded within the seal body. In one embodiment, the tilt body of the tilt member defines a substantially circular, ovular, or elliptical cross sectional area. In another embodiment, the tilt body is defined at a distal end of the tilt member from the fluid bearing wall. In various embodiments, the tilt member further includes a shaft attached to the fluid bearing wall and the tilt body. In one embodiment, a gap is defined between the shaft of the tilt member and the seal body. In another embodiment, the gap is defined at an outlet between the passage and the cavity. In still various embodiments, a seal member is extended from the shaft. In one embodiment, the seal member is disposed within the seal body between the tilt body and the fluid bearing wall.

In various embodiments, the fluid bearing wall and the tilt member are together detachably coupled to the seal body such as to enable movement of the fluid bearing wall and the tilt member relative to the seal body. In one embodiment, the spring member and the fluid bearing wall are integrally attached together, and the seal body is detachable from the integral spring member and fluid bearing wall. In another embodiment, the seal body and the spring member are integrally attached together, and the fluid bearing wall is detachable from the integral spring member and seal body.

In one embodiment, the fluid bearing wall defines a plenum between the fluid bearing face and an aft face of the fluid bearing wall. The fluid bearing wall includes a seal disposed in the plenum.

In another embodiment, the seal body defines a fluid feed opening in fluid communication with the fluid passage at the tilt member.

Another aspect of the present disclosure is directed to a turbo machine including a rotor assembly including a rotor face rotatable relative to a centerline axis, a stator structure adjacent to the rotor assembly, and a seal assembly attached to the stator structure. The seal assembly includes a fluid bearing wall including a bearing face in which the bearing face and the rotor face of the rotor assembly together define a clearance therebetween. The bearing face defines a fluid opening through the fluid bearing wall in fluid communication with the clearance. A tilt member is extended from the fluid bearing wall and attached thereto. The tilt member defines a fluid passage therethrough in fluid communication with the fluid opening at the bearing face of the fluid bearing wall. A seal body surrounds the tilt member and a cavity is defined between the tilt member and the seal body. A spring member is coupled to the seal body and the fluid bearing wall. A passage is defined between the fluid bearing wall and the seal body.

In one embodiment, the seal assembly further includes a connecting member attaching together the fluid bearing wall and the seal body. The connecting member is configured to maintain a substantially proportional clearance between the rotor assembly and the fluid bearing wall.

In various embodiments of the turbo machine, the tilt member further includes a tilt body surrounded within the seal body at a distal end of the tilt member from the fluid bearing wall. In one embodiment, the tilt member includes a shaft attached to the fluid bearing wall and the tilt body. A gap is defined at an outlet between the passage and the cavity. The gap is between the shaft of the tilt member and the seal body. In another embodiment, a seal member is extended from the shaft. The seal member is disposed within the seal body between the tilt body and the fluid bearing wall. In another embodiment, the fluid bearing wall and the tilt member are together detachably coupled to the seal body such as to enable rotation of the tilt member relative to the seal body.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 6 is a cross sectional perspective view of an exemplary embodiment of the seal assembly according to an aspect of the present disclosure; and FIG. 7 is a cross sectional side view of an exemplary embodiment of the seal assembly according to an aspect of the present disclosure.

Figure 1:
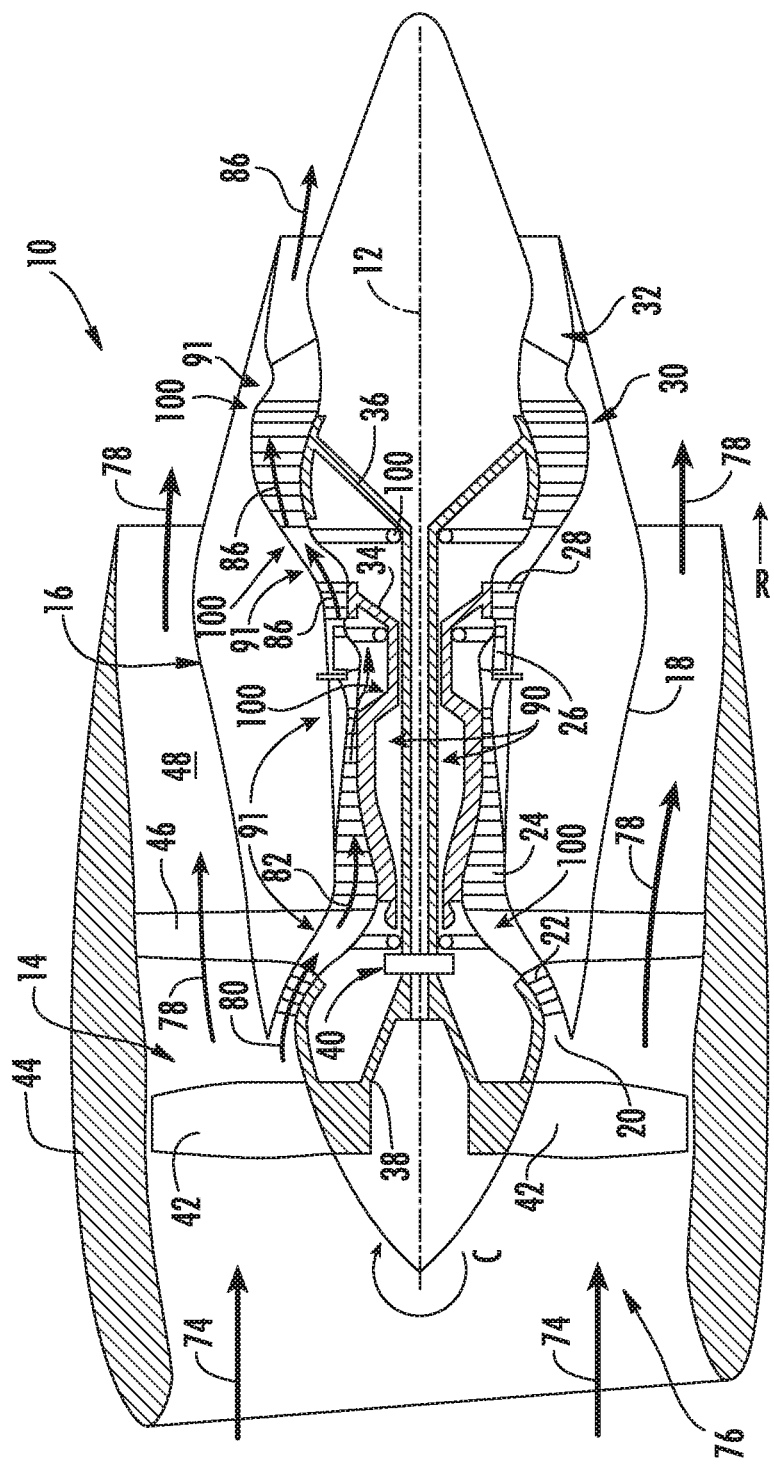
FIG. 1 is an exemplary embodiment of a turbo machine including an exemplary seal assembly according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of an improved seal assembly that accommodates tilt or rotation of the seal and rotor assembly relative to one another are generally provided that may improve durability and performance of the seal assembly and the rotor assembly. The seal assembly includes a fluid bearing wall defining a bearing face through which a fluid opening is defined through the fluid bearing wall. A tilt member is extended from and attached to the fluid bearing wall, through which a fluid passage is defined in fluid communication with the fluid opening at the fluid bearing wall. A seal body surrounds the tilt member, and a spring member is coupled to the seal body and the fluid bearing wall. The fluid bearing wall and the tilt member are together detachably coupled to the seal body such as to enable movement or rotation of the tilt member within the seal body. The spring members provide a reactive force against the seal body, and the tilt member rotates or is otherwise compliant based at least on the reactive force of the spring member, such as to allow the fluid bearing wall remain substantially parallel to the rotor assembly at a plurality of operating conditions of the rotor assembly and turbo machine.

Referring now to the drawings, FIG. 1 is a schematic partially cross-sectioned side view of an exemplary turbo machine 10 herein referred to as "engine 10" as may incorporate various embodiments of the present disclosure. Although further described below with reference to a gas turbine engine, the present disclosure is also applicable to bearing assemblies and turbomachinery in general, including turbofan, turbojet, turboprop, and turboshaft gas turbine engines, including marine and industrial turbine engines and auxiliary power units, steam turbine engines, or other rotary machines that include bearing assemblies. As shown in FIG. 1, the engine 10 has a longitudinal or axial engine centerline axis 12 that extends there through for reference purposes. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure compressor and turbine rotatable with an intermediate pressure shaft altogether defining a three-spool gas turbine engine.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

During operation of the engine 10, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26, such as depicted schematically by arrows 82. The compressed air 82 flows into the combustion section 26.

The compressed air 82 is mixed with a liquid and/or gaseous fuel and burned, thus generating combustion gases, as indicated schematically by arrows 86, within the combustion section 26. The combustion gases 86 flow downstream and expand at the HP turbine 28 and the LP turbine 30 to drive the respective HP compressor 24 and LP compressor 22 attached thereto.

Referring still to FIG. 1, the combinations of the HP compressor 24, the HP shaft 34, and the HP turbine 28, or the LP compressor 22, the LP shaft 36, and the LP turbine 30, may define a rotor assembly 90 of the engine 10. In other embodiments, such as described above, the rotor assembly 90 may include combinations of the intermediate compressor, intermediate shaft, and intermediate turbine. The rotor assembly 90 is rotatable relative to the centerline axis 12 of the engine 10. In still various embodiments, the engine 10 includes a static structure 91, such as, but not limited to, the outer casing 18, or another casing, generally adjacent to the rotor assembly 90 or supporting rotation of the rotor assembly 90. A seal assembly 100 is included at the static structure 91 and directly adjacent to the rotor assembly 90, such as depicted in various embodiments in regard to FIGS. 2-7 below.

Figure 2:
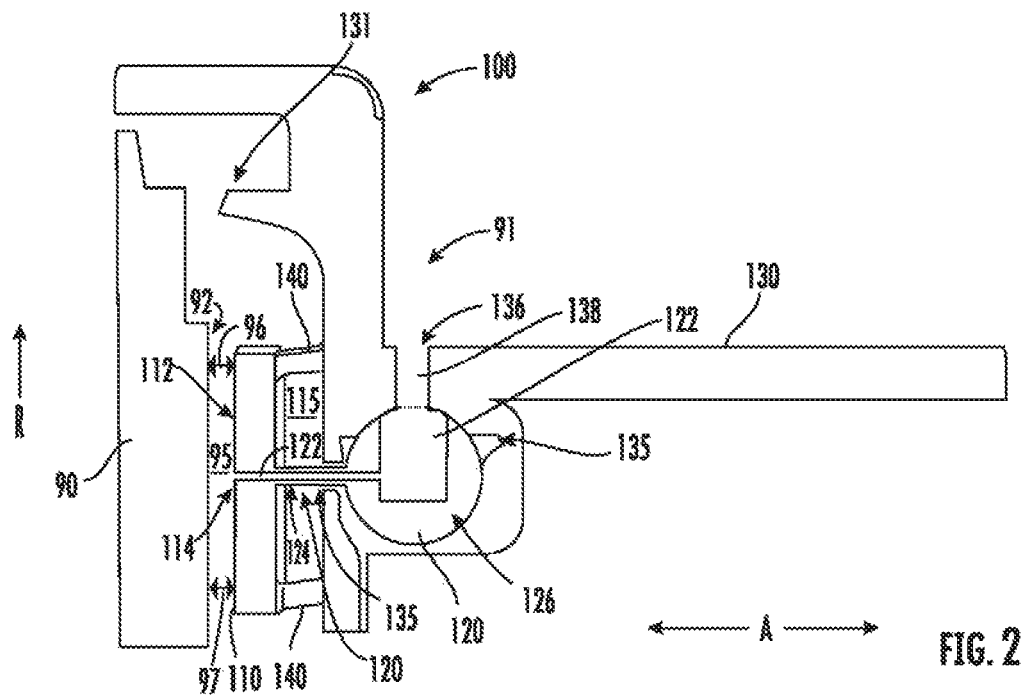
FIG. 2 is a cross sectional side view of an exemplary embodiment of a seal assembly according to an aspect of the present disclosure.
Figure 3:
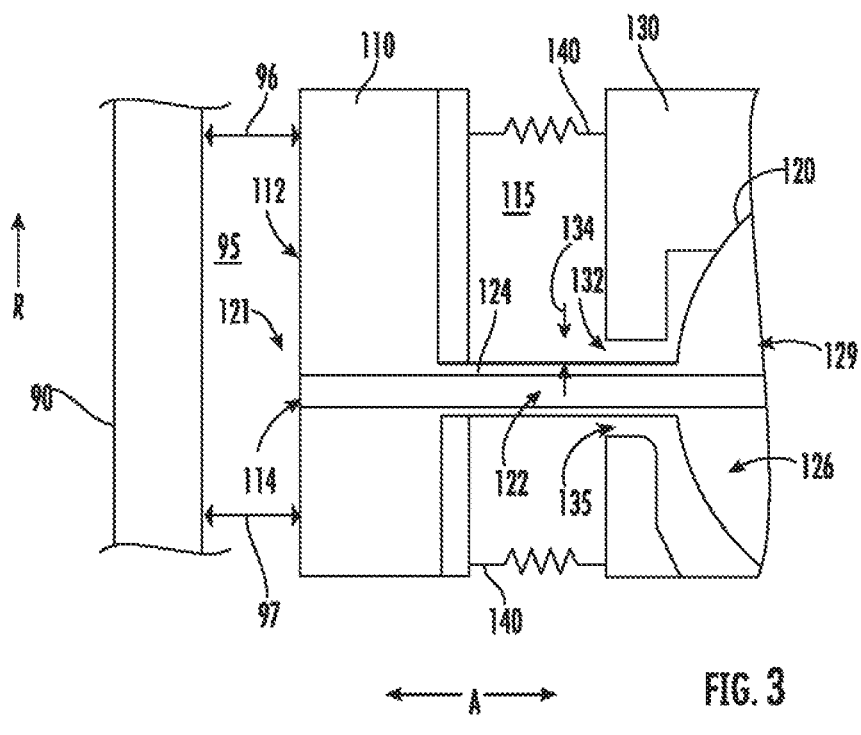
FIG. 3 is a detailed cross sectional side view of the seal assembly of FIG. 2.

Referring now to FIG. 2, a cross sectional side view of an exemplary embodiment of the seal assembly 100 is provided. Referring also to FIG. 3, a detailed view of a portion of the exemplary embodiment of the seal assembly 100 is further provided. The seal assembly 100 includes a fluid bearing wall 110 including a bearing face 112. The bearing face 112 defines a fluid opening 114 through the fluid bearing wall 110. A tilt member 120 is extended from and attached to the fluid bearing wall 110. The tilt member 120 defines a fluid passage 122 therethrough in fluid communication with the fluid opening 114 at the bearing face 112 of the fluid bearing wall 110.

The seal assembly 100 includes a seal body 130 surrounding the tilt member 120, or at least substantially surrounding the tilt member 120. A cavity 135 is defined between the tilt member 120 and the seal body 130. A spring member 140 coupled to the seal body 130 and the fluid bearing wall 110. A passage 115 is defined between the fluid bearing wall 110 and the seal body 130. The cavity 135 defined between the tilt member 120 and the seal body 130, and the passage 115 defined between the fluid bearing wall 110 and the seal body 130, are together in fluid communication. In one embodiment, the cavity 135 and the passage 115 are together in direct fluid communication such that an outlet 132 (FIG. 3) is defined between the passage 115 and the cavity 135. Referring further to detailed view provided in regard to FIG. 3, the outlet 132 at the seal body 130 defines a gap 134 between the seal body 130 and the tilt member 120.

In various embodiments, the tilt member 120 includes a shaft 124 attached to the fluid bearing wall 110 and a rotational joint or tilt body 126 of the tilt member 120. The rotational joint or tilt body 126 defines a substantially circular, ovular, or elliptical cross sectional area at a distal end 129 (i.e., separated along an axial direction A relative to a proximal end 121 at the fluid bearing wall 110) of the tilt member 120 from the fluid bearing wall 110. The tilt body 126 and at least a portion of the shaft 124 are each defined within the seal body 130 and surrounded by thereby. The tilt member 120 including the tilt body 126 and the shaft 124 together define a structure enabling rotation of tilt member 120 and the fluid bearing wall 110 attached to the tilt member 120 based on changes in loading at the fluid bearing wall 110 and operational conditions of the engine 10.

In one embodiment, the gap 134 between the shaft 124 of the tilt member 120 and the seal body 130 increases and decreases based on rotation of the tilt member 120 and the fluid bearing wall 110. During operation of the engine 10 including the seal assembly 100, the rotor assembly 90 may generally move or displace along the axial direction A based on changes in operating condition, such as loading or thrust output, of the engine 10. As the rotor assembly 90 displaces along the axial direction A, a clearance 95 (e.g., along the axial direction A) between the rotor assembly 90, or more particularly, a radially extended rotor face 92 (FIGS. 2 and 5) of the rotor assembly 90, and the bearing face 112 of the fluid bearing wall 110 changes based on changes in operating condition of the engine 10. Differences in the clearance 95 along the radial direction R may result such that a first clearance 96 may be different than a second clearance 97 radially separated from the first clearance 96. The differences between the first clearance 96 and the second clearance 97 are resultant from different forces or loadings at the bearing face 112.

Referring still to FIGS. 2-3, during operation of the engine 10 including the tilt member 120, the differences between the first clearance 96 and the second clearance 97 load the fluid bearing wall 110 against the seal body 130 via the spring members 140. The difference in loading against the fluid bearing wall 110 exemplified by the first clearance 96 and the second clearance 97 load the fluid bearing wall 110 such that the tilt member 120 rotates within the cavity 135 between the tilt member 120 and the seal body 130. The seal assembly 100 including the tilt member 120 enables increased tolerance or mitigation of contact or rubbing of the rotor assembly 90 to the fluid bearing wall 110.

Various embodiments of the seal assembly 100 include the tilt member 120 as nominally unattached to the seal body 130. In a more specific embodiment, when the engine 10 is not in operation, or when the rotor assembly 90 is within a predefined loading or operating condition, the tilt member 120 is unattached to the seal body 120. Stated alternatively, the seal body 120 is generally unattached, uncoupled, or otherwise defines the cavity 135 around the tilt body 126 and the shaft 124 within the seal body 130.

In other embodiments, it should be appreciated that the tilt member 120 may partially touch the seal body 130. However, it should be appreciated that the tilt member 120 is movably and detachably coupled to the seal body 130 such that the gap 134 between the shaft 124 and the seal body 130 at the outlet 132 may increase and decrease based on tilt or rotation of the fluid bearing wall 110 and tilt member 120, and further based on operating condition of the engine 10. In one particular embodiment, the fluid bearing wall 110 and the tilt member 120 define one or more components separate or detachable from the seal body 130, such as to enable movement or rotation of the fluid bearing wall 110 and the tilt member 120 relative to the seal body 130.

In still various embodiments, the spring members 140 are configured to balance movement or rotation of the tilt member 120, such as to control a rate at which the tilt member 120 rotates, such as to enable the fluid bearing wall 110 to be substantially parallel to the rotor assembly 90 at a plurality of operating conditions of the engine 10. In one embodiment, the spring members 140 are attached to the fluid bearing wall 110 and may be detachably coupled to the seal body 130. In another embodiment, the spring members 140 are attached to the seal body 130 and may be detachably coupled to the fluid bearing wall 110. In various embodiments, the spring members 140 are configured to regulate differences between the first clearance 96 and the second clearance 97 and rotation of the tilt member 120.

In still yet various embodiments, the fluid passage 122 controls or regulates movement of the fluid bearing wall 110 along the axial direction A. Referring to FIG. 2, the seal body 130 may generally define a fluid feed opening 136 and a fluid feed passage 138 each in fluid communication with the fluid passage 122 within the tilt member 120. In various embodiments, the tilt member 120 more particularly defines the fluid passage 122 through the shaft 124 and the tilt body 126 in fluid communication with the fluid feed passage 138 and the fluid feed opening 136. In one embodiment, the tilt body 126 may touch the seal body 130 such as to limit or restrict an amount of flow of fluid egressing through the cavity 135 between the tilt member 120 and the seal body 130 rather than flowing through the fluid passage 122.

Figure 4:
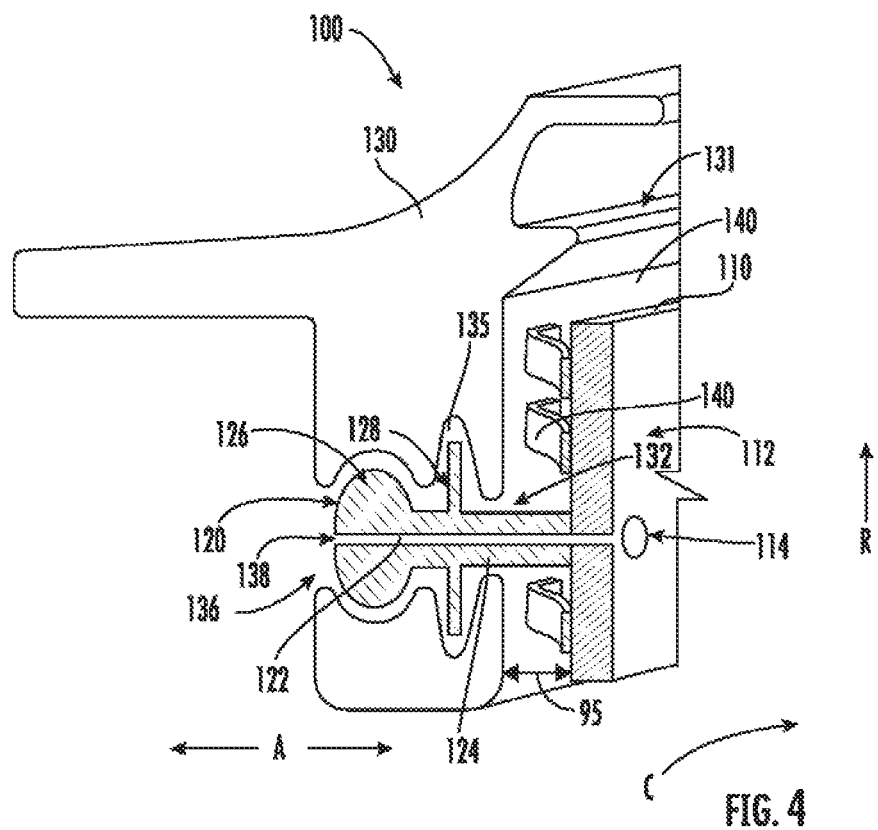
FIG. 4 is a cross sectional perspective view of an exemplary embodiment of the seal assembly according to an aspect of the present disclosure.

Referring now to FIG. 4, another exemplary embodiment of the seal assembly 100 is generally provided. The seal assembly 100 depicted in regard to FIG. 4 is configured substantially similarly as described in regard to FIGS. 2-3. However, in FIG. 4 the seal assembly 100 further includes a seal member 128 extended from the shaft 124 of the tilt member 120. The seal member 128 is disposed between the distal end 129 and the proximal end 121 of the tilt member 120. In one embodiment, the seal member 128 is generally along the radial direction R within the seal body 130 between the tilt body 126 and the fluid bearing wall 110. The seal member 128 generally limits or restricts a flow of fluid between the tilt member 120 and the seal body 130. For example, the seal member 128 may generally restrict a flow of fluid such as to enable a sufficient or desirable flow of fluid through the fluid passage 122 of the tilt member 120 from the fluid feed passage 138 and fluid feed opening 136.

Figure 5:
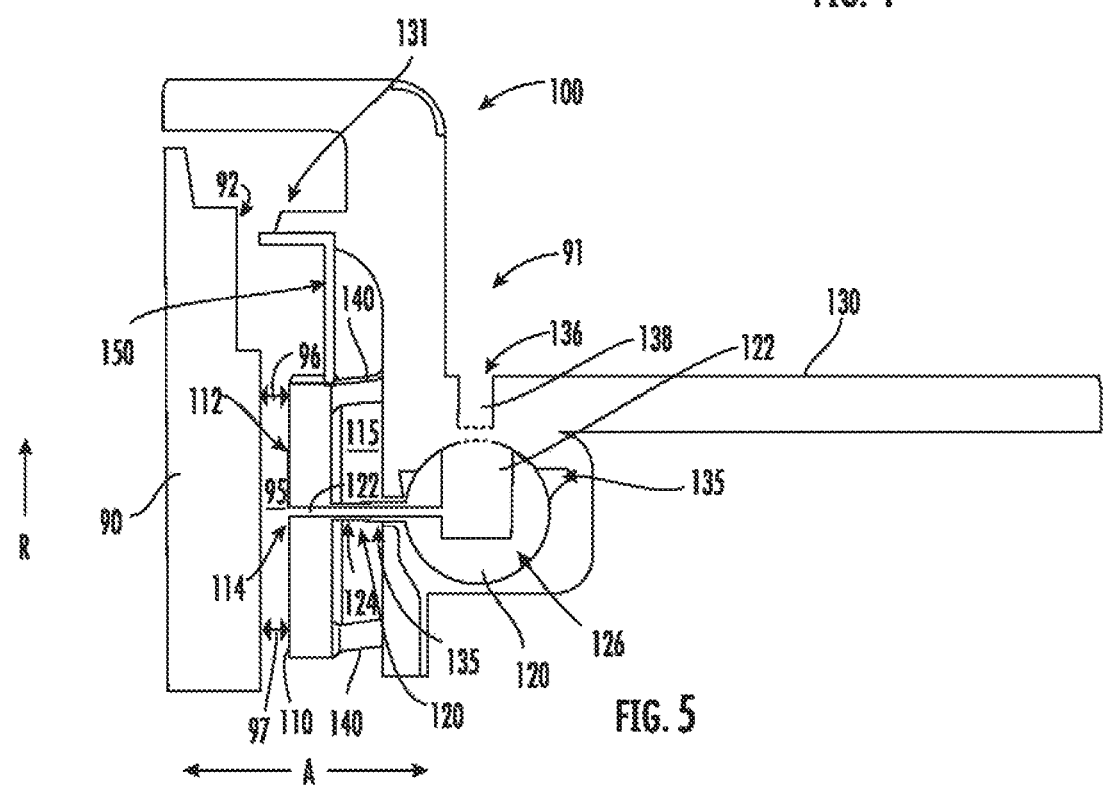
FIG. 5 is a cross sectional side view of an exemplary embodiment of the seal assembly according to an aspect of the present disclosure.

Referring now to FIGS. 2 and 5, the seal body 130 further includes a primary tooth 131 extended along the axial direction A toward the rotor assembly 90. The primary tooth 131 restricts a flow between the rotor assembly 90 and the seal body 130 such as to define a pressure drop that creates a force acting against fluid bearing wall 110 of the seal assembly 100. As operating conditions of the engine 10 change, such as loading or thrust output that changes displacement of the rotor assembly 90 along the axial direction A, the clearance 95 between the rotor assembly 90 and the fluid bearing wall 110 changes. The changes in rotor assembly 90 loading change the pressure drop, such as to increase or decrease the loading of the fluid bearing wall 110 against the seal body 130 via the spring members 140 such as described above.

Referring more particularly to FIG. 5, the seal assembly 100 further includes a connecting member 150 attaching together the fluid bearing wall 110 and the seal body 130 at the primary tooth 131. The connecting member 150 may generally maintain the clearance 95 between the rotor assembly 90 and the fluid bearing wall 110 substantially proportional. For example, the connecting member 150 may generally reduce or mitigate a disproportionate difference between the first clearance 96 and the second clearance 97.

Referring now to FIGS. 6-7, further exemplary embodiments of the seal assembly 100 are generally provided. The seal assembly 100 depicted in regard to FIGS. 6-7 may be configured substantially similarly such as described in regard to FIGS. 2-5. In FIGS. 6-7, the seal assembly 100 further defines a plenum 155 (FIG. 7) between the bearing face 112 and an aft wall 113 of the fluid bearing wall 110. In various embodiments, the aft wall 113 is disposed directly adjacent to the seal body 130 such as to provide a surface at which the spring members 140 are coupled to the fluid bearing wall 110. In one embodiment, a seal 160 is disposed in the plenum 155 within the fluid bearing wall 110. In one particular embodiment, the seal 160 is disposed between the aft wall 113 and the bearing face 112 of the fluid bearing wall 110. In various embodiments, the seal 160 may define a spline seal defining bulbous features 152 (FIG. 7) generally touching the fluid bearing wall 110 such as to provide a desired flow rate or pressure of fluid within the fluid bearing wall 110. The seal 160 may further even or regulate the loading that may be exerted onto the fluid bearing wall 110 such that tilt or rotation of the tilt member 120 is desirably regulated relative to changes in operating condition of the rotor assembly 90 and engine 10 (FIG. 1).

Referring now to FIGS. 1-7, various embodiments of the fluid bearing wall 110, the tilt member 120, and the seal body 130 are extended along a circumferential direction C (FIGS. 6-7) relative to the axial centerline axis 12 of the engine 10. In one embodiment, the fluid bearing wall 110, the tilt member 120, or the seal body 130, or combinations thereof, may define separate or detachable segments in circumferential arrangement. In still various embodiments, one or more of the clearances 95, passages 115, 122, cavities 135, plenums 155, etc. defined by the fluid bearing wall 110, the tilt member 120, or the seal body 130, or combinations thereof, may be extended along the circumferential direction C.

It should be appreciated that various embodiments of the fluid passage 122, the outlet 132, the fluid opening 114, the fluid feed opening 136, the fluid feed passage 138, or combinations thereof, may define discrete openings e.g., one or a plurality of openings defined therethrough such as to provide desired pressure drops, differentials, losses, deltas, etc. such as to define a desired fluid bearing between the rotor assembly 90 and the fluid bearing wall 110 relative to one or more operating conditions of the engine 10.

Still various embodiments of the seal assembly 100 generally provided herein may be manufactured via one or more processes known as additive manufacturing or 3D printing. Still other embodiments may additionally or alternatively manufacture the seal assembly 100 via one or more machining, forging, casting, or joining processes, including, but not limited to, welding, brazing, soldering, friction bonding, or adhesives, or mechanical fasteners (e.g., nuts, bolts, screws, tie rods, pins, etc.), other appropriate joining mechanisms or methods.

Embodiments of the seal assembly 100 shown and described herein may substantially define an aspirating face seal assembly or other appropriate generally non-contacting seal assembly configuration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A seal assembly, the seal assembly comprising:
a fluid bearing wall comprising a bearing face, wherein the bearing face defines a fluid opening through the fluid bearing wall;

a tilt member extended from the fluid bearing wall and attached thereto, wherein the tilt member defines a fluid passage therethrough in fluid communication with the fluid opening at the bearing face of the fluid bearing wall;

a seal body surrounding the tilt member, wherein a cavity is defined between the tilt member and the seal body; and a spring member coupled to the seal body and the fluid bearing wall, wherein a passage is defined between the fluid bearing wall and the seal body; and wherein the cavity and the passage are in fluid communication.

2. The seal assembly of claim 1, wherein the tilt member further comprises a tilt body surrounded within the seal body.

3. The seal assembly of claim 2, wherein the tilt body of the tilt member defines a circular, ovular, or elliptical cross sectional area.

4. The seal assembly of claim 2, wherein the tilt body is defined at a distal end of the tilt member from the fluid bearing wall.

5. The seal assembly of claim 2, wherein the tilt member comprises a shaft attached to the fluid bearing wall and the tilt body.

6. The seal assembly of claim 5, wherein a gap is defined between the shaft of the tilt member and the seal body.

7. The seal assembly of claim 5, wherein a seal member is extended from the shaft.

8. The seal assembly of claim 7, wherein the seal member is disposed within the seal body between the tilt body and the fluid bearing wall.

9. The seal assembly of claim 1, wherein the fluid bearing wall and the tilt member are together detachably coupled to the seal body such as to enable movement of the fluid bearing wall and the tilt member relative to the seal body.

10. The seal assembly of claim 9, wherein the spring member and the fluid bearing wall are integrally attached together, and wherein the seal body is detachable from the integral spring member and the fluid bearing wall.

11. The seal assembly of claim 9, wherein the seal body and the spring member are integrally attached together, and wherein the fluid bearing wall is detachable from the integral spring member and seal body.

12. The seal assembly of claim 1, wherein the fluid bearing wall defines a plenum between the fluid bearing face and an aft face of the fluid bearing wall, and wherein the fluid bearing wall comprises a seal disposed in the plenum.

13. The seal assembly of claim 1, wherein the seal body defines a fluid feed opening in fluid communication with the fluid passage at the tilt member.

14. A turbo machine, the turbo machine comprising:
a rotor assembly rotatable relative to a centerline axis, wherein the rotor assembly comprises a rotor face extended radially and circumferentially relative to the centerline axis;
a stator structure adjacent to the rotor assembly; and
a seal assembly attached to the stator structure, wherein the seal assembly comprises:
a fluid bearing wall comprising a bearing face, wherein the bearing face and the rotor face together define a clearance therebetween, and wherein the bearing face defines a fluid opening through the fluid bearing wall in fluid communication with the clearance;
a tilt member extended from the fluid bearing wall and attached thereto, wherein the tilt member defines a fluid passage therethrough in fluid communication with the fluid opening at the bearing face of the fluid bearing wall;
a seal body surrounding the tilt member, wherein a cavity is defined between the tilt member and the seal body; and
a spring member coupled to the seal body and the fluid bearing wall, wherein a passage is defined between the fluid bearing wall and the seal body; and wherein the cavity and the passage are in fluid communication.

15. The turbo machine of claim 14, wherein the seal assembly further comprises:
a connecting member attaching together the fluid bearing wall and the seal body, wherein the connecting member is configured to maintain a substantially proportional clearance between the rotor assembly and the fluid bearing wall.

16. The turbo machine of claim 15, wherein the fluid bearing wall and the tilt member are together detachably coupled to the seal body such as to enable rotation of the tilt member relative to the seal body.

17. The turbo machine of claim 14, wherein the tilt member further comprises a tilt body surrounded within the seal body at a distal end of the tilt member from the fluid bearing wall.

18. The turbo machine of claim 17, wherein the tilt member comprises a shaft attached to the fluid bearing wall and the tilt body, and wherein a gap is defined at an outlet between the passage and the cavity, and wherein the gap is between the shaft of the tilt member and the seal body.

19. The seal assembly of claim 18, wherein a seal member is extended from the shaft, and wherein the seal member is disposed within the seal body between the tilt body and the fluid bearing wall.

* * * * *